(12) United States Patent
Gross et al.

(10) Patent No.: US 8,962,190 B1
(45) Date of Patent: Feb. 24, 2015

(54) THREE-DIMENSIONAL ELECTRODES WITH CONDUCTIVE FOAM FOR ELECTRON AND LITHIUM-ION TRANSPORT

(75) Inventors: Adam F. Gross, Santa Monica, CA (US); John Wang, Glendora, CA (US); Tobias Schaedler, Oak Park, CA (US); Hung Nguyen, Los Angeles, CA (US); Larken E. Euliss, Agoura Hills, CA (US); Christopher Roper, Pacific, CA (US); Ping Liu, Irvine, CA (US)

(73) Assignee: HRL Laboratories, LLC, Malibu, CA (US)

( * ) Notice: Subject to any disclaimer, the term of this patent is extended or adjusted under 35 U.S.C. 154(b) by 326 days.

(21) Appl. No.: 13/316,501

(22) Filed: Dec. 10, 2011

Related U.S. Application Data

(60) Provisional application No. 61/424,470, filed on Dec. 17, 2010.

(51) Int. Cl.
*H01M 4/00* (2006.01)
*H01M 4/80* (2006.01)
*H01M 4/70* (2006.01)
*H01M 4/74* (2006.01)

(52) U.S. Cl.
CPC ...... *H01M 4/80* (2013.01); *H01M 4/70* (2013.01); *H01M 4/808* (2013.01); *H01M 4/742* (2013.01)
USPC ............................ 429/233; 429/241; 429/209

(58) Field of Classification Search
CPC ......... H01M 4/70; H01M 4/742; H01M 4/80; H01M 4/808; H01M 4/06; H01M 4/13; H01M 4/38; H01M 4/661; H01M 4/663; H01M 10/052; H01M 204/021; C25C 7/02; C25B 11/02; C25B 11/035; Y02E 60/122
USPC ......... 429/233, 235, 236, 238, 241, 244, 209, 429/128; 204/280, 284, 289, 288
See application file for complete search history.

(56) References Cited

U.S. PATENT DOCUMENTS

2010/0003599 A1* 1/2010 Nonoshita et al. ............ 429/209
2010/0239913 A1* 9/2010 Kelley et al. ................ 429/231.8
2010/0310927 A1* 12/2010 Imai et al. ..................... 429/174

FOREIGN PATENT DOCUMENTS

WO  WO 2008-059937  *  5/2008  ............. H01M 4/02
WO  WO 2009-096160  *  8/2009  ............. H01M 2/26

* cited by examiner

*Primary Examiner* — Raymond Alejandro
(74) *Attorney, Agent, or Firm* — O'Connor & Company

(57) ABSTRACT

The current thickness limitations of battery electrodes are addressed. An electrode includes an electrically conductive porous foam layer, an energy-storage material in contact with the porous foam layer, and electrically conductive porous foam protrusions extending from the porous foam layer into the energy-storage material. The energy-storage material is not contained within the pores of the foam layer or the foam protrusions. These electrodes allow lithium ions (and other metal ions, if desired) to diffuse deeper into a thick energy-storage material layer, compared to conventional planar electrodes. In particular methods, fluidic foam precursors can be templated in a mold, followed by conversion into a solid conductive foam that includes the electrically conductive porous foam protrusions. The result is batteries with surprisingly high energy densities.

11 Claims, 10 Drawing Sheets

Ridged current collector filled with anode material

THREE-DIMENSIONAL ELECTRODES WITH CONDUCTIVE FOAM FOR ELECTRON AND LITHIUM-ION TRANSPORT

PRIORITY DATA

This patent application claims priority under 35 U.S.C. §120 from U.S. Provisional Patent Application No. 61/424,470, filed Dec. 17, 2010, the disclosure of which is hereby incorporated by reference herein for all purposes.

FIELD OF THE INVENTION

The present invention generally relates to improved electrodes for batteries, fuel cells, and other energy-storage and energy-delivery devices.

BACKGROUND OF THE INVENTION

Meeting the energy needs of humans in a sustainable manner is a global challenge. Storage and conversion of energy become increasingly relevant as we move towards greater reliance on renewable or non-traditional energy sources. Devices to store and deliver electricity, in particular, need to be able to efficiently convert chemical energy into electrical energy. Batteries and fuel cells are commercial examples of such devices that are in widespread use today, and that are expected to rise in importance as energy technologies in the future.

Batteries currently suffer from relatively low energy densities, i.e. the quantity of energy (or power) that can be delivered to a user relative to the weight of the device. Higher energy densities in batteries enable longer duration intervals between recharging and increased processing power for portable electronic devices. Furthermore, improved energy densities would enable increased-range electric vehicles and distributed energy-storage.

Improved energy density for batteries can in principle be achieved by increasing the weight fraction of the active materials in battery cells. One way to achieve this is through the use of thicker electrodes. However, these approaches have not been successful. Thick battery electrodes tend to crack under repeated cycling, which electrically isolates the energy-storage material and decreases battery capacity. Conventional electrodes in current state-of-art battery systems such as lithium-ion batteries comprise a film coated onto a metal foil current collector. The film is typically formed from a polymer binder, conductive agents such as carbonaceous materials, and active materials. The active material loadings or the thickness of the electrode film are restricted due to the internal resistance increase of the film, limitations on lithium-ion diffusion, and stress cracking as ions diffuse in and out the electrode, which results in loss of electrical contact and reduced battery capacity.

Two factors limiting the energy density of rechargeable batteries are thus stress cracking of electrodes during cycling and increasing resistance as electrode thickness increases. These two limitations may be overcome by transitioning from a two-dimensional to a three-dimensional current collector that provides fracture-resistant electrical connections across the electrode. One potential solution is to create a three-dimensional current collector from conductive foam that is filled with energy-storage material. This can result in a thicker electrode with all material electrically connected to the foam, minimizing loss of capacity from stress cracking. This solution is hindered, however, because the foam pore volume limits the amount of energy-storage material in the electrode. Additionally, the presence of the foam throughout the electrode creates a weight and power density penalty.

What is needed is an invention to break the current thickness limitations of electrodes, resulting in batteries with greater energy densities. Electrodes are desired that allow lithium ions (or other metal ions, if desired) to diffuse deeper into a thick energy-storage material layer (such as a cathode material), compared to conventional planar electrodes. There is a continuing commercial desired to improve battery electrodes.

SUMMARY OF THE INVENTION

The present invention addresses the aforementioned needs in the art, as will now be summarized and then further described in detail below.

In some variations, this invention provides an electrode comprising an electrically conductive layer, an energy-storage material in contact with the electrically conductive layer, and a plurality of electrically conductive porous foam protrusions extending from the electrically conductive layer into the energy-storage material, wherein the energy-storage material is capable of inserting or releasing a selected metal ion, and wherein pores of the porous foam protrusions contain less than about 10% by pore volume of the energy-storage material. The electrode may function as a battery cathode or battery anode.

The pores of the porous foam protrusions preferably contain less than about 5% by pore volume of the energy-storage material. In some embodiments, the pores of the porous foam protrusions do not contain any of the energy-storage material. Preferably, the porous foam protrusions are chemically inert with respect to the energy-storage material. Even when no energy-storage material is contained in the pores, there will still be contact between the outer walls of the pores and the energy-storage material.

In some embodiments, the electrically conductive layer is an electrically conductive porous foam layer, which may be the same material or a different porous material as the porous foam protrusion material. The electrically conductive layer may alternatively be a dense, non-porous layer. The electrode has an electrical conductivity in the range of about $10^{-3}$ S/cm to about $10^5$ S/cm.

The porous foam protrusions may have a geometry selected from the group consisting of rectangular, square, round, cylindrical, polygonal, pyramidal, and combinations thereof. In some embodiments, the porous foam protrusions form reticulated lines. The porous foam protrusions may be substantially continuous in one, two, or three dimensions. In some embodiments, the protrusions form a three-dimensional pattern, such as a honeycomb arrangement.

The porous foam protrusions may have an average protrusion width selected from about 1 µm to about 100 µm, such as from about 10 µm to about 50 µm. The porous foam protrusions may have an average protrusion height selected from about 10 µm to about 10 mm, such as from about 100 µm to about 500 µm. The porous foam protrusions may have an average protrusion spacing between adjacent protrusions selected from 10 µm to about 10 mm, such as from about 100 µm to about 500 µm.

In some embodiments, the porous foam protrusions include pores that are characterized by a peak in a pore-size distribution between about 10 nm and about 20 µm. The porous foam protrusions preferably contain at least some pores that are not very tortuous for metal ions to quickly diffuse through the liquid electrolyte. In some embodiments, the porous foam protrusions contain pores having an average tortuosity of less than about 5, 4, 3, or 2.

When employed in a battery structure, the electrode further comprises (contains) a liquid electrolyte that is contained in the pores. The liquid electrolyte contained in the pores preferably has a higher ionic conductivity for the selected metal ion, such as $Li^+$, compared to the ionic conductivity of the selected metal ion through the energy-storage material itself. Thus, the porous foam protrusions provide pathways for metal ions to be transported at faster rates and/or deeper within the energy-storage material, compared to an electrode without the porous foam protrusions.

The electrically conductive layer and the porous foam protrusions may be independently fabricated from or coated with an element selected from the group consisting of C, Cu, Ni, Au, Ag, Al, Sn, Cr, Zn, Ti, Co, Pt, Mn, Fe, V, Pd, W, Nb, Ta, Ru, and combinations and alloys thereof.

The electrically conductive layer and/or the porous foam protrusions may comprise carbon in the form of carbon aerogels, mesoporous carbon, macroporous carbon, vitreous carbon, graphitic carbon, glassy carbon, or combinations thereof. Optionally, the electrically conductive layer and/or the porous foam protrusions may comprise carbon coated with a metal selected from the group consisting of Cu, Ni, Au, Ag, Al, Sn, Cr, Zn, Ti, Co, Pt, Mn, Fe, V, Pd, W, Nb, Ta, Ru, and combinations and alloys thereof.

In some embodiments, the selected metal ion is $Li^+$. For lithium-ion cathodes, the energy-storage material may be selected from the group consisting of lithium metal oxides, lithium metal phosphates, lithium metal silicates, sulfur, lithium sulfides, and combinations thereof. In some embodiments, the energy-storage material is selected from the group consisting of $LiMO_2$ (M=Co, Ni, Mn, or combinations thereof), $LiM_2O_4$ (M=Mn, Ti, or combinations thereof), $LiMPO_4$ (M=Fe, Mn, Co, or combinations thereof), $LiM_xM'_{2-x}O_4$ (M, M'=Mn or Ni), sulfur, lithium sulfides, and combinations thereof.

For lithium-ion anodes, the energy-storage material may be selected from the group consisting of carbon, silicon, aluminum, tin, and combinations, oxides, or alloys thereof. In some embodiments, the energy-storage material comprises an alloy of (i) a first metal selected from copper, titanium, tungsten, iron, cobalt, or nickel and (ii) a second metal selected from silicon, aluminum, tin, germanium, indium, or antimony.

In another variation of the invention, an electrode precursor is provided, comprising an electrically conductive layer and a plurality of electrically conductive porous foam protrusions extending from one side of the porous foam layer, wherein the porous foam protrusions have an average protrusion width selected from about 1 μm to about 100 μm;

wherein the porous foam protrusions have an average protrusion height selected from about 10 μm to about 10 mm;

wherein the porous foam protrusions have an average protrusion spacing between adjacent protrusions selected from 10 μm to about 10 mm; and wherein the porous foam protrusions contain pores having an average tortuosity of less than 5.

The porous foam protrusions contain pores having an average tortuosity of about 2 or less, in some embodiments. The porous foam protrusions may include pores that are characterized by a peak in a pore-size distribution between about 10 nm and about 20 μm. The average protrusion width may be selected from about 10 μm to about 50 μm. The average protrusion height may be selected from about 100 μm to about 500 μm. The average protrusion spacing may be selected from about 100 μm to about 500 μm.

The porous foam protrusions within the electrode precursor may have a geometry selected from the group consisting of rectangular, square, round, cylindrical, polygonal, pyramidal, and combinations thereof. In some embodiments, the porous foam protrusions form reticulated lines.

The electrically conductive layer and the porous foam protrusions may be made from the same material, if desired.

Other variations of the invention provide a method of fabricating an electrode or electrode precursor comprising an electrically conductive layer and a plurality of electrically conductive porous foam protrusions extending from the electrically conductive layer, the method comprising:

(a) providing or receiving a mold for a desired three-dimensional conductive foam structure;

(b) introducing a fluidic foam precursor into the mold;

(c) converting the fluidic foam precursor into a solid conductive foam in situ within the mold; and (d) removing the mold from the solid conductive foam, wherein the solid conductive foam consists essentially of the electrically conductive layer and the plurality of electrically conductive porous foam protrusions extending from the porous foam layer.

In some embodiments, step (c) comprises thermal, chemical, or electrochemical curing of the fluidic foam precursor, followed by removal of solvent, if present. Some embodiments, comprise carbonizing the fluidic foam precursor to form a carbon conductive foam. Step (c) may include electroplating into the fluidic foam precursor from a metal plating solution in a high-internal-phase emulsion, followed by removal of the metal plating solution. The mold may be fabricated from a polymer, silicon, a silicone, a glass, or a combination thereof.

In some embodiments, the solid conductive foam comprises an element selected from the group consisting of C, Cu, Ni, Au, Ag, Al, Sn, Cr, Zn, Ti, Co, Pt, Mn, Fe, V, Pd, W, Nb, Ta, Ru, and combinations and alloys thereof. In some embodiments, the solid conductive foam comprises carbon in the form of carbon aerogels, mesoporous carbon, macroporous carbon, vitreous carbon, graphitic carbon, glassy carbon or combinations thereof; and wherein the carbon is optionally coated with a metal selected from the group consisting of Cu, Ni, Au, Ag, Al, Sn, Cr, Zn, Ti, Co, Pt, Mn, Fe, V, Pd, W, Nb, Ta, Ru, and combinations and alloys thereof.

The method may further include introducing an energy-storage material into the electrode or electrode precursor, wherein pores of the porous foam protrusions contain less than about 10%, or less about 5%, by pore volume of the energy-storage material. In some embodiments, the pores of the porous foam protrusions do not contain any of the energy-storage material.

DETAILED DESCRIPTION OF EMBODIMENTS OF THE INVENTION

The apparatus, devices, systems, and methods of the present invention will now be described in detail by reference to various non-limiting embodiments of the invention, including the exemplary figures.

Unless otherwise indicated, all numbers expressing dimensions, capacities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques. As used in this specification and the appended claims, the singular forms "a," "an," and "the" include plural referents unless the context clearly indicates otherwise.

Some variations of this invention are premised on the utilization of foam structures within electrodes that protrude up through the electrode material and serve as conductive pathways for electrons and ions (such as lithium ions). The porous foam "protrusions" (interchangeably called "pillars" or "ridges" herein) increase electrical connectivity in the electrode. The presence of the porous foam protrusions increases the effective electrical and ion conductivity within the electrode structure. This enables thicker electrodes which are mechanically stronger and are less susceptible to capacity loss from stress cracking of the electrode material. The porous foam protrusions are not filled with an energy-storage material, thereby enabling higher lithium ion (or other ion) diffusivities through the pores. A plurality of distinct protrusions may be periodically or randomly spaced throughout the electrode to limit the power and mass penalty from extra material in the electrode.

As used herein, an "electrode" should not be construed as limiting in any way, and is meant to include any collector or emitter of electrical charge or electric-charge carriers. Electrodes described herein may be employed in any electrical, electrochemical, photovoltaic, or other energy devices, including batteries and fuel cells. An electrode provided by the invention can be a cathode and/or an anode for any energy device.

Some variations provide a battery electrode containing porous foam pillars or ridges that extend, three-dimensionally, up into the electrode to provide diffusion pathways for $Li^+$ ions as well as for electrons. This foam structure allows thicker electrodes compared to electrodes produced from known fabrication techniques. Unlike existing foam current collectors that contain the electrode material within pores, the foam pillars or ridges disclosed herein are not entirely filled with energy-storage material. Preferably, the foam pillars or ridges do not contain any energy-storage material, allowing for faster lithium diffusion through the pores of the pillars or ridges.

Figure 1A:
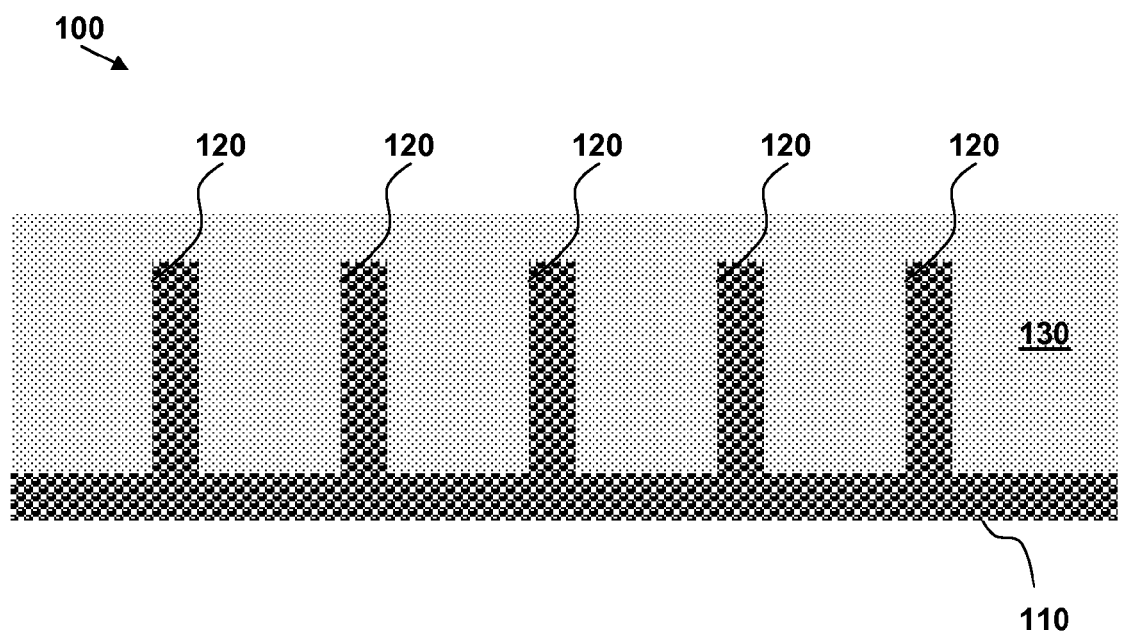
FIG. 1A depicts an electrode comprising porous conductive foam pillars extending from a porous conductive foam layer into energy-storage material, in some variations of the invention.

An example of an electrode structure provided by the present invention is shown in FIG. 1A. The sketch in FIG. 1A depicts an electrode 100 comprising porous conductive foam pillars 120 extending from porous conductive foam layer 110 into energy-storage material 130 to provide lithium and electron transport.

Figure 1B:
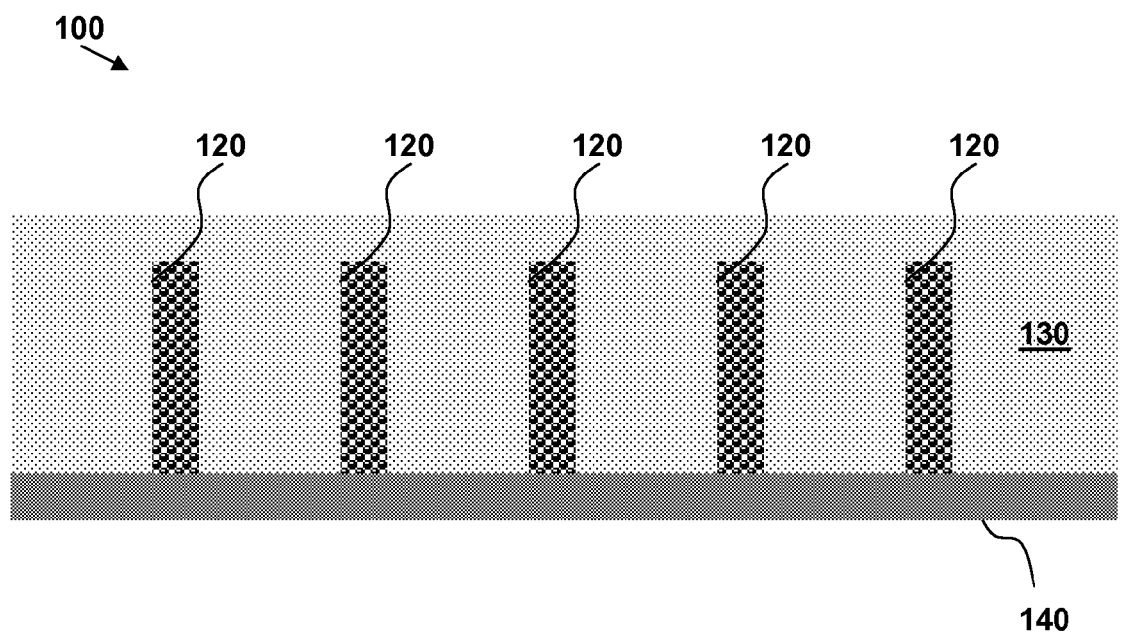
FIG. 1B depicts an electrode comprising porous conductive foam pillars extending from a porous conductive foam layer into energy-storage material, in some embodiments wherein the foam layer is a different material than the foam pillars.

In some embodiments, the conductive foam layer 110 and the conductive foam pillars 120 are made from the same materials, such as when they are formed as a continuous structure, as suggested in FIG. 1A. In other embodiments, such as depicted in FIG. 1B, a conductive layer 140 is provided, and conductive foam pillars 120 made of a different material than conductive layer 140 are formed, or otherwise disposed, on the conductive foam layer 140. In FIG. 1B, the conductive layer 140 need not be porous and need not be a foam. The conductive layer 140 may be a dense layer of electrically conducting material, such as a metal.

The conductive foam pillars 120 are in contact with, but are not filled with (or alternatively, not entirely filled with), energy-storage material 130. The multiple conductive foam pillars 120 are distinct three-dimensional protrusions into the energy-storage material 130. In these embodiments, the conductive foam pillars 120 do not physically touch each other but are electrically connected via the conductive foam layer 110 or conductive layer 140. The number of foam pillars 120 depicted in FIGS. 1A and 1B is merely exemplary.

With continued reference to FIGS. 1A and 1B, $Li^+$ ions (or other selected ions) produced at the opposite electrode can be transported through energy-storage material 130 and into the pillars 120, and then back into energy-storage material 130 at a location closer to conductive foam layer 110 or conductive layer 140. That is, the conductive foam pillars 120 allow $Li^+$ ions to diffuse deep into the electrode 100 by providing a conductive pathway, free of energy-storage material, for the $Li^+$ ions to be effectively transported.

The conductive foam pillars 120 overcome a serious lithium-ion transport problem in thick electrodes. Conventionally, thick electrodes create a liquid-phase transport resistance for lithium ions (or other ions) due to the consumption of these ions during reaction. These ions are then replenished through diffusion from the opposite electrode, through the separator. Thick electrodes increase the distance for such diffusion. The foam protrusions allow facile ionic conductivity through the electrolyte contained in the pores. This ionic conductivity is faster than ionic conductivity through the energy-storage material, because of the higher porosity in the foam.

Thick electrodes also can have high tortuosity which makes ion diffusion slower. The conductive foam pillars 120 preferably contain pores with relatively low tortuosities, thus delivering lithium ions (or other ions), at high rates, deep into the electrode. The crookedness of the pore channels is defined by the tortuosity. For straight pores, the tortuosity is equal to one and increases as the pores become more crooked, or tortuous. For example, the average pore tortuosity within the conductive foam pillars 120 may be less than about 10, 5, 4, 3, or 2, in various embodiments. Preferably, the average pore tortuosity within the conductive foam pillars 120 is less than or equal to about 2, such as 2.0, 1.9, 1.8, 1.7, 1.6, 1.5, 1.4, 1.3, 1.2, or 1.1.

The particular geometry and dimensions of the conductive foam protrusions may vary widely. For example, the protrusions may be rectangular, square, round, cylindrical, polygonal, or pyramidal in shape. The protrusions may include straight or curved walls and surfaces, which may be relatively smooth or rough. The plurality of protrusions may be regular in shape and size, or they may be irregular or random. Mixtures of shapes may be employed.

The conductive foam layer 110 or conductive layer 140 is not limited to any particular geometry. For example, the conductive foam layer 110 or conductive layer 140 may take the form of a foil, wire, rod, slab, tab, metal mesh, perforated metal, metallized plastic film, metal grid, metal wool, or any other suitable surface from which the foam protrusions can be disposed.

The conductive foam protrusions are three-dimensional current collectors to transport electrons to and from electrochemically active materials. In some embodiments, the conductive foam protrusions are continuous in two dimensions and discontinuous in the third dimension, such as in the form of long ridges (e.g., see FIG. 6). The ridges may be parallel or perpendicular to one another and may be straight, curved, in a zig-zag structure, in a series of aligned or unaligned chevrons, or in reticulated lines.

In some embodiments, the conductive foam protrusions are discontinuous in two dimensions, such as in the form of isolated prisms, e.g. rectangular pillars.

In some embodiments, the conductive foam protrusions are continuous in three dimensions. For example, the protrusions may be interconnected, such as on a honeycomb arrangement. It is noted that in this case, there would effectively be only a single distinct protrusion.

The dimensions of the conductive foam protrusions 120, and the spacing between distinct protrusions, may vary. For example, the average width, diameter, or effective diameter of the protrusions 120 may be selected from about 1 μm to about 100 μm, such as about 10-50 μm. The average height of the protrusions 120 (i.e., distance that the pillars or ridges protrude out into the energy-storage material) may be selected from about 10 μm to about 10 mm, such as about 100-500 μm. Mixtures of protrusion sizes may be employed, such as alternating short and tall pillars, or some other regular or random configuration. Depending on the method of fabrication, there will generally be a range of protrusion sizes; the size distribution may be narrow or wide and may include dimensions lower or higher than the ranges described above.

The average spacing between protrusions 120 (i.e., the trenches between pillars or ridges) may be selected from about 10 μm to about 10 mm, such as about 100-500 μm. It should be understood that other dimensions may be employed, with varying effectiveness. There is generally a trade-off because a high density of foam protrusions allows high conduction but reduces the overall energy density of the device employing the electrode. Spacing the protrusions apart throughout the electrode limits the energy and mass penalty from extra material in the electrode.

In some embodiments, dimensions may be determined or optimized using theoretical models of the electrode (such as in Example 1 below).

The thickness of the electrode 100 may also vary. The electrode thickness includes the height of the protrusions 120, plus the thickness of the conduction foam layer 110 or conductive layer 140. The thickness of the conduction foam layer 110 or conductive layer 140 may be selected, for example, from about 10 μm to about 10 mm or more, such as about 100-1000 μm or about 50-500 μm. The electrode 100 thickness may vary, in some embodiments, from about 20 μm to about 20 mm, such as about 100 μm-10 mm or about 75-750 μm, for example. Even thicker electrodes than 20 mm may be fabricated, if desired, such as up to 100 mm, 1 cm, or higher. Thick electrodes are made possible with this invention, due to the presence of the conductive foam protrusions 120. There is no theoretical limit to the thickness of the electrode disclosed herein.

Both of the conduction foam layer 110, as well as the conductive foam pillars 120, are porous foams. A "porous foam" means that a significant fraction of the volume consists of void spaces. The porosity of the foam is not especially limited but may be at least 50%, 60%, 70%, 80%, 90%, or more, in various embodiments. The conductive layer 140 (FIG. 1B) may be a porous foam, but that is not necessary.

In some embodiments, the porous foams are mesoporous, macroporous, or both. In some embodiments, the conduction foam layer 110 and the conductive foam pillars 120 include pores that are characterized by a peak in a pore-size distribution between about 10 nm and about 20 μm, such as about 50 nm to about 5 μm, or about 100-1000 nm. In some embodiments, the porous foams have a bimodal or trimodal pore-size distribution. The pore size may be tuned to optimize lithium (or other ion) diffusion into cathode or anode materials while the interconnected structure of the foam imparts electrical connectivity.

The conduction foam layer 110 or conductive layer 140, and the conductive foam pillars 120, comprise a conductive material such as carbon or a metal. In some embodiments, the foam layer 110 or conductive layer 140 and the foam protrusions 120 are independently fabricated or coated with an element selected from the group consisting of C, Cu, Ni, Au, Ag, Al, Sn, Cr, Zn, Ti, Co, Pt, Mn, Fe, V, Pd, W, Nb, Ta, Ru, and combinations and alloys thereof. The conducting layer and the foam protrusions may be made from the same material, or they may be made from different materials. Various non-metals may be present, such as carbon, phosphorous, nitrogen, and so on. Non-metals may be present to form alloys, or due to impurities.

In some embodiments, the foam layer 110 or conductive layer 140 and the foam protrusions 120 comprise carbon in the form of carbon aerogels, mesoporous carbon, macroporous carbon, vitreous carbon, graphitic carbon, or combinations thereof. In certain embodiments, the conductive layer 110 or 140 and/or the foam protrusions 120 comprise carbon coated with a metal selected from the group consisting of Cu, Ni, Au, Ag, Al, Sn, Cr, Zn, Ti, Co, Pt, Mn, Fe, V, Pd, W, Nb, Ta, Ru, and combinations and alloys thereof.

Preferably, the conductive layer 110 or 140 and the foam protrusions 120 form a structurally continuous interface. By "structurally continuous," it is meant that there are little or no gaps, voids, or physical discontinuities at the interface. Continuous paths enhance the electron flow to the current collector. In some embodiments, such as in FIG. 1A, the interface between the foam layer 110 and the foam protrusions 120 is also chemically continuous. That is, the metal(s) or carbon used in the foam protrusions 120 may be the same as the metal(s) or carbon used in the foam layer 110. While such material matching may be beneficial for economic or practical reasons, it is by no means necessary for the present invention.

Both of the conductive foam layer 110 or conductive layer 140, as well as the conductive foam pillars 120, are electrically conductive. The electrical conductivity of these foams may vary widely, and in some embodiments will be selected from about $10^{-3}$ S/cm to $10^5$ S/cm, such as about $10^{-1}$ to $10^3$ S/cm or about 1 to $10^2$ S/cm. The overall electrical conductivity of the electrode 100 will generally be a similar range of values, since the length scales are the same.

The conductive foam pillars 120 are ionically conductive for metal ions, such as (but not limited to) lithium ions. In some embodiments, the ionic conductivity of these foams is selected from about 0.0001 S/cm to about 10 S/cm, such as about 0.01-1 S/cm or about 0.1-1 S/cm. The overall ionic conductivity (e.g., $Li^+$ conductivity) of the electrode 100 will generally be a similar range of values. In some embodiments, the conductive foam layer 110 or conductive layer 140 is also ionically conductive for lithium ions or other selected ions.

In some embodiments, the ionic conductivity in the electrode is enhanced by transport of ions contained in a liquid electrolyte, which may penetrate into and out of the pores of the conductive foam pillars. Lithium diffusion may occur through the liquid electrolyte in the foam layer. Because the foam has a high porosity, lithium diffusion within the foam pillars is less impeded than lithium diffusion through the electrode energy-storage material that is disposed around the foam pillars.

Preferably, both of the conduction foam layer 110 or conductive layer 140, as well as the conductive foam pillars 120, are thermally conductive so that heat can be effectively transported out of the foams during battery operation, to maintain a desired operating temperature and/or to assist with cooling. Because the foam employed is an electrically conductive foam, the foam will also be thermally conductive. In metals and carbon, thermal conductivity approximately tracks electrical conductivity according to the Wiedemann-Franz law, as freely moving valence electrons transfer not only electric current but also heat energy. In some embodiments, the thermal conductivity of the conduction foam layer 110 or conductive layer 140, as well as the conductive foam pillars 120, is selected from about 10 W/m·K to about 1000 W/m·K, such as about 50-500 W/m·K or about 25-250 W/m·K.

The energy-storage material 130 contained within electrode 100 may vary widely. In some embodiments wherein electrode 100 is a battery cathode, the energy-storage material 130 is selected from the group consisting of lithium metal oxides, lithium metal phosphates, lithium metal silicates, sulfur, lithium sulfides, and combinations thereof. In some embodiments, the energy-storage material 130 is selected from the group consisting of $LiMO_2$ (M=Co, Ni, Mn, or combinations thereof), $LiM_2O_4$ (M=Mn, Ti, or combinations thereof), $LiMPO_4$ (M=Fe, Mn, Co, or combinations thereof), and $LiM_xM'_{2-x}O_4$ (M, M'=Mn or Ni).

In some embodiments wherein electrode 100 is a battery anode, the energy-storage material 130 is selected from the group consisting of carbon, silicon, aluminum, tin, and combinations, oxides, or alloys thereof. Some embodiments employ a battery anode with an energy-storage material comprising an alloy of (i) a first metal selected from copper, titanium, tungsten, iron, cobalt, or nickel and (ii) a second metal selected from silicon, aluminum, tin, germanium, indium, antimony, or another suitable metal. When the energy-storage material 130 is carbon, it may include such carbon materials as graphite, coke, graphene, soft carbons, and hard carbons. These energy-storage materials 130 are contained around the conductive foam protrusions 120.

Preferably, the porous foam protrusions are chemically inert with respect to the energy-storage material. Even when no energy-storage material is contained in the pores, there will still generally be contact between the outer walls of the pores and the energy-storage material.

A cathode may further comprise one or more conductive fillers to provide enhanced electronic conductivity. Examples of conductive fillers include, but are not limited to, conductive carbons, graphites, activated carbon fibers, non-activated carbon nanofibers, metal flakes, metal powders, metal fibers, carbon fabrics, metal mesh, and electrically conductive polymers. The cathode may also further comprise other additives such as, for example, aluminas, silicas, and transition-metal chalcogenides.

The cathode may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, polytetrafluoroethylenes, polyvinylidene fluorides, ethylene-propylene-diene rubbers, polyethylene oxides, acrylates, methacrylates, divinyl ethers, and the like.

Metal-ion batteries such as lithium-ion batteries will include a liquid electrolyte to conduct lithium ions. The liquid electrolyte acts as a carrier of lithium ions (or other selected metal ions) between the cathode and the anode when the battery passes an electric current through an external circuit. The electrolyte generally includes a solvent and a lithium salt (anion plus lithium cation), optionally with one or more additives to enhance functionality or stability, for example.

Lithium salts include, but are not limited to, $LiClO_4$, $LiBF_4$, $LiPF_6$, $LiCF_3SO_3$, $LiCF_3CO_2$, $LiAsF_6$, $LiSbF_6$, $LiAlCl_4$, LiCl, LiBr, and LiI, which may be used alone or as a mixture of two or more. The concentration of the salt is not particularly limited, such as about 0.1 to 5 mol/L of the electrolytic solution.

Examples of the solvent that can be used include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, diethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. Ethylene carbonate and propylene carbonate are preferable.

The separator between the anode and cathode may be an insulating thin film that is high in ion permeability and that has a prescribed mechanical strength. An olefin polymer, a fluorine-containing polymer, a cellulose polymer, a polyimide, a nylon, glass fiber, or alumina fiber, in the form of a non-woven fabric, a woven fabric, or a microporous film, may be used as the material of the separator, in some embodiments.

Various methods may be employed to fabricate the electrodes provided by the invention. In some variations, three-dimensional conductive foams may be templated using molds, followed by introducing electrode materials into the foams, i.e. around the foam protrusions.

Fluidic templating is an attractive route for forming mesoporous and macroporous conductive foams. In some embodiments, fluidic precursors are formed into a template/mold that has the shape of the desired three-dimensional foam structure. The mold may be made of a polymer (e.g., a fluoropolymer), silicon, a silicone, or glass, for example. The material choice for the mold may need to account for mechanical properties, such as stiffness or elastic modulus, to minimize or prevent material from breaking upon mold release, and for ideal aspect ratio.

Figure 2A:
FIGS. 2A-2D illustrates a method to produce an electrode structure, according to some embodiments of the invention.
Figure 2B:
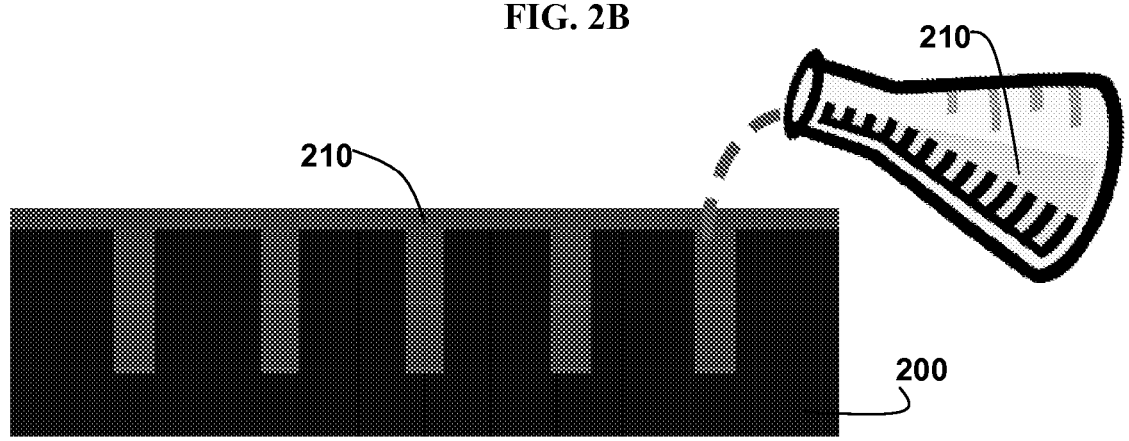
Figure 2C:
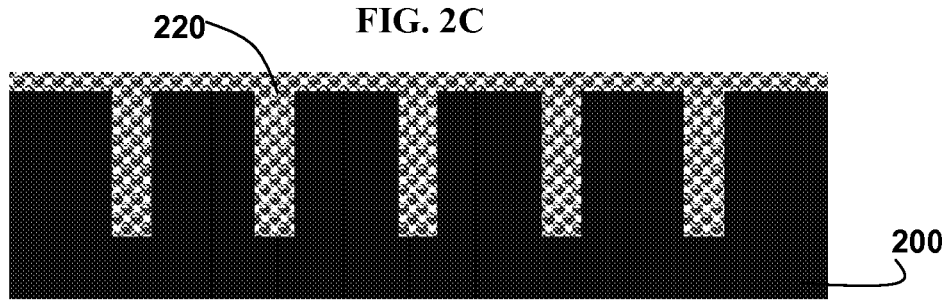
Figure 2D:
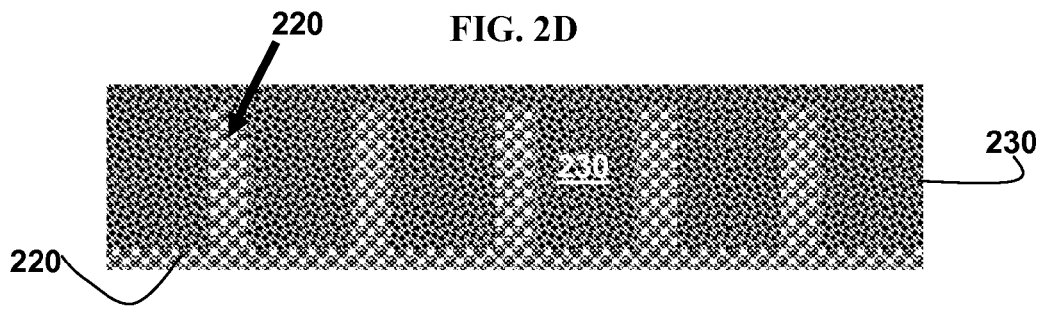

Some method embodiments to produce an electrode structure can be understood with reference to FIGS. 2A-2D. First, a mold 200 for a three-dimensional current collector is created (FIG. 2A). A fluidic foam precursor 210 is then poured into the mold 200 (FIG. 2B). The fluidic foam precursor 210 is cured or electroplated to form the conductive foam 220, followed by removal of any solvent (contained initially in fluidic foam precursor 210) from the mold 200 (FIG. 2C). Carbon or metallic foam precursors 210 may be thermally, chemically, or electrochemically cured in the mold 200 to form the conductive foam 220. Finally, the mold 200 is removed, and energy-storage material 230 is introduced (FIG. 2D).

A variety of fluidic foam precursors may be employed to fabricate the conductive foams. In some embodiments, carbon aerogel conductive foams are fabricated from resorcinol, formaldehyde, water, and catalyst by curing a solution into a resorcinol-formaldehyde gel, and then carbonizing (such as by firing). See, for instance, Examples 6 and 7 herein.

In some embodiments, carbon foams are formed by blending an aerogel precursor with oil and surfactant into a high-internal-phase emulsion, followed by curing of carbon precursors, solvent exchange, and carbonization. Certain methods may employ the teachings set forth in Gross and Nowak, "Hierarchical Carbon Foams with Independently Tunable Mesopore and Macropore Size Distributions," *Langmuir* 26(13), 11378-11383 (2010), which is incorporated by reference herein.

In some variations, metal foams can be formed by electrodepositing metal ions onto a metal foil (or other suitable conductive layer) immersed in an emulsion. An emulsion is a mixture of two or more immiscible liquids, such as oil and water. An emulsion includes a continuous phase, also referred to as an external phase, and a dispersed phase, also referred to as an internal phase.

The continuous phase of the emulsion may include a metal-ion solution. The metal-ion solution contains one or more metal ions, or salts thereof, selected to attain a desired composition of the metal foam. The metal-ion solution should include a polar solvent, preferably water (i.e., an aqueous solution).

The polar metal-ion solution preferably contains one or more metals salts, optionally with an acid and/or base to adjust the solution pH value and increase the conductivity of the solution. In certain embodiments, one or more of the metal salts are selected from the group consisting of $CuSO_4$, $Cu(NO_3)_2$, $NiSO_4$, and $Ni(NO_3)_2$. Exemplary acids to reduce the solution pH include $H_2SO_4$, $HNO_3$, and $HCl$. Exemplary bases to increase the solution pH include $Cu(OH)_2$, $Ni(OH)_2$, $NaOH$, $KOH$, and $NH_3$.

The dispersed (internal) phase of the emulsion should consist of one or more non-polar fluids, such as hydrophobic liquids. Exemplary non-polar fluids for the dispersed phase include, but are not limited to, hydrocarbons, fluorocarbons, and siloxanes. Siloxanes include silicone oils, such as polydimethylsiloxane, and may be inert or reactive (e.g., for polymerization or crosslinking reactions). The dispersed phase may range from about 1 wt % to 99 wt %, preferably from about 50 wt % to about 90 wt %, such as about 60, 65, 70, 75, or 80 wt % in the emulsion.

An emulsifier is preferably employed to stabilize the emulsion. An "emulsifier" as intended herein includes any additive to enhance the kinetic stability of the emulsion phase interface. Examples are surfactants, high-molecular-weight polymers, and inorganic nanoparticles known as Pickering agents. While emulsifiers are not strictly required, effective emulsifiers will enhance the lifetime of the emulsion. The continuous and dispersed phases could be blended under high shear, but the rest of the method would need to be carried out rather quickly before the two phases coalesce.

In some embodiments, the emulsifier is a surfactant. Possible surfactants are cationic, anionic, or nonionic surfactants or nanoparticles. Anionic surfactants are preferred in some embodiments. Surfactants may be selected from alkyl sulfates, alkyl ether sulfates, sulfonate fluorosurfactants, alkyl benzene sulfonates, alkyl aryl ether phosphates, alkyl ether phosphates, alkyl carboxylates, carboxylate fluorosurfactants, quaternary ammonium salts, amino acids, betaines, sultaines, fatty alcohols, polyoxyethyleneglycol alkyl ethers, glucoside alkyl ethers, polyoxypropylene glycol alkyl ethers, polyoxyethylene glycol octylphenol ethers, polyoxyethylene glycol alkyllphenol ethers, glycerol alkyl ethers, polysorbates, sorbitan alkyl esters, and poloxamers. Preferred surfactants are sodium dodecyl sulfate, dodecylbenzene sulfonate sodium salt, cetyl pyridinium chloride, and 4-(1,1,3,3-tetramethylbutyl)phenylpolyethylene glycol (e.g., TRITON® X-100 nonionic surfactants).

In some embodiments, the emulsifer is a high-molecular-weight polymer such as poly(vinyl pyrolidone), poly(vinyl alcohol), poloxamers, carboxymethyl cellulose, hydroxypropyl cellulose, poly(acrylic acid), or poly(ethylene glycol).

In some embodiments, the emulsifier is a Pickering agent. For example, reference is made to Hermant et al., "Conductive Pickering-poly(high internal phase emulsion) composite foams prepared with low loadings of single-walled carbon nanotubes," *Chem. Commun.*, 2009, 2738-2740. Hermant et al. is incorporated by reference herein for its teachings of Pickering emulsions stabilized by nanoparticles or nanotubes.

The amount, composition, and properties of the dispersed phase will dictate the overall morphology of the metal foam. For example, viscosity of the dispersed phase affects the cell dimensions. The cell dimensions in the metal foam may be adjusted by changing the dispersed-phase fluid viscosity, where higher-viscosity fluids result in larger cells.

Generally speaking, the dimensions of the metal-foam cells are dictated primarily by the chemical composition and properties of the dispersed phase, while the dimensions and propensity of the pores in the cell walls are dictated primarily by the amount of dispersed phase present. The cell and pore dimensions are therefore separately adjustable in the porous metal foam.

In some embodiments, metal foams are formed by electroplating from a metal plating solution in a high-internal-phase emulsion. High-internal-phase emulsions, or HIPEs, are defined as "emulsions in which the droplet phase occupies greater than 74.05% of the emulsion volume, this figure representing the maximum volume occupiable by uniform spheres" (Barbetta et al., "High internal phase emulsions (HIPEs) containing divinylbenzene and 4-vinylbenzyl chloride and the morphology of the resulting PolyHIPE materials," *Chem. Commun.*, 2000, 221-222). These emulsions can form stable templates and have droplets packed densely enough that they contact their neighbors. The result is that there will be windows between cells templated by the dispersed-phase droplets due to the areas where droplets are pressed against one another, which adds to the porosity of the final metal foam.

In some embodiments, the templating emulsion is synthesized in a laboratory blender, high-shear mixer, or microfluidizer from Microfluidics Corp. The emulsion may also be formed by mechanically or magnetically stirring two phases until they form one phase; this technique will result in a broader droplet-size distribution and thus a broader cell size distribution in the metal foam. If a narrower cell size distribution is desired, the dispersed-phase droplets may be fabricated using a microfluidic setup which typically produces extremely uniform droplets in the continuous phase.

To deposit the metal ions from the emulsion to a surface, some form of deposition from the metal-ion solution may be employed. Deposition methods include electroplating, electrophoretic deposition, underpotential deposition, and electroless deposition.

In some embodiments, electroplating is employed to produce the metal foam. The walls of the metal foam are made from metal particles, which themselves are formed through reduction of metals in the electroplating solution. The metals are electroplated through the continuous phase onto a conductive substrate. Possible electrochemical techniques include galvanostatic, potentiostatic, cyclic-voltammetric, and pulse-current techniques. The particle size and surface morphology of the electrochemically plated metal foam can be controlled by varying the current, voltage, scan rates, and/or the time.

Some embodiments employ electroless deposition of metals. Electroless deposition, also known as chemical or autocatalytic plating, is a non-galvanic deposition method that involves several simultaneous reactions in an aqueous solution, which occur without the use of external electrical power. A negative charge is achieved on the surface by chemical, rather than electrical, means. For example, when hydrogen is released by a reducing agent, such as sodium hypophosphite, a negative charge is produced on the surface. The metals are then deposited through the continuous phase onto the surface to produce the metal foam. In some embodiments employing electroless deposition, the surface is a polymer foam, such as polyurethane foam, which is coated with a metal by electroless plating to form a metal foam.

In other embodiments of the invention, the metal foam may be produced starting from an aerogel template, such as (but not limited to) carbon aerogels. In these embodiments, the templating emulsion includes a polar aerogel precursor solution as the continuous phase, and one or more non-polar fluids as the dispersed phase. The aerogel precursor solution is mixed with an emulsifier and blended with an organic fluid to form an uncured foam. The uncured foam may be spread on a surface or filled in a mold, for example. The uncured foam may be cured by solidifying the aerogel template. Then, both the dispersed phase and the polar fluid in the aerogel are removed. The aerogel template may optionally be heated at elevated temperature to alter the aerogel properties.

A layer of one or more metals may then be deposited onto the aerogel template, using electroplating or electroless deposition, for example. Any of the metals and dimensions previously described may be utilized to deposit metals onto the aerogel template. After deposition of metals, the original aerogel template may then be removed, at least in part, leaving the metal foam. Removal of the aerogel template may be accomplished by chemical, thermal, electrical, and/or other means. For example, when the aerogel template is a carbon aerogel, the carbon may be removed through carbon oxidation to carbon oxides which leave as vapor. When the aerogel template is another type of aerogel, such as silica aerogels (from electroless plating), indium tin oxide aerogels, tungsten oxide aerogels, ruthenium oxide aerogels, or antimony tin oxide aerogels, the aerogel may be removed through chemical reactions at suitable conditions. The remaining metal will form a metal foam consisting of cells with porous metal walls.

The emulsions are typically viscoelastic fluids. The structure and relative position of emulsion droplets can therefore shift during the growth of the metal in the continuous phase upon deposition. In order to decrease disruption of the emulsion network during deposition, it may be desirable to crosslink the dispersed-phase droplets. When such crosslinking is desired, a preferred technique for crosslinking utilizes hydrosilation chemistry. In some embodiments, suitable catalysts, such as platinum-based catalysts, can covalently bond polysiloxane species containing vinyl and hydrosilyl groups. Crosslinking can take place within discrete droplets as well as between droplets, to create a static or at least more-stable emulsion structure. This technique can also result in a much higher viscosity of the dispersed-phase droplets in the emulsion.

Other methods to fabricate the electrodes provided by the invention may include, but are not limited to, metal or carbon deposition onto nucleated islands disposed on a base layer, or selective etching out of a starting foam to leave the pillars or ridges behind. Although this latter method would tend to be wasteful of material, it could technically produce the conductive foam protrusions.

Also, it is possible to separately produce pillars and then attach them onto a base layer, using some physical, electrical, or magnetic means for alignment so that the longer dimension protrudes out from the base layer. For example, if both pillars and the base layer are metal, they could be soldered or heated to form a bond. In other embodiments, a sacrificial material may be utilized to preserve spacing between the pillars during an attachment step, the sacrificial material being subsequently removed. It is preferred, for practical and commercial reasons, to attach the pillars in a parallel method, rather than serially attaching one pillar after another.

Some variations of this invention enable batteries with improved energy density as well as improved power density. In contrast to current conventional battery electrodes, electrodes in preferred embodiments of this invention form a conductive matrix to significantly reduce the internal resistance and enable much thicker electrodes.

A battery preferably includes a one-piece structure where the current-collecting metal foam is the same piece of metal as the back foil used to transport electrons into and out of the battery. This prevents delamination of battery material (from volume expansion driven by chemical intercalation) and the resulting loss of capacity or lifetime. Furthermore, this structure reduces the electrical resistance of the electrode and faster battery cycling may be realized.

In some embodiments, the battery can be packaged into either prismatic format cells or cylindrical cells. In the prismatic format, the stacked structure is preferably sealed with a packaging material capable of preventing air and water contamination of the battery.

Certain embodiments of the invention will now be further described with reference to the examples, which by no means should be construed to limit the invention.

EXAMPLES

Example 1A

Multiphysics Model of Electrode

A COMSOL Multiphysics® finite-element model is developed for a Li-ion battery with a three-dimensional electrode, comprising the conductive foam protrusions as described above. The model is based on a one-dimensional model described in Newman et al., *J. Electrochem. Soc.* 1996, 143, 1890. Electronic and ionic charge transport, material transport in electrolyte and electrodes, and Butler-Volmer electrode kinetics are included in the model.

Figure 3A:
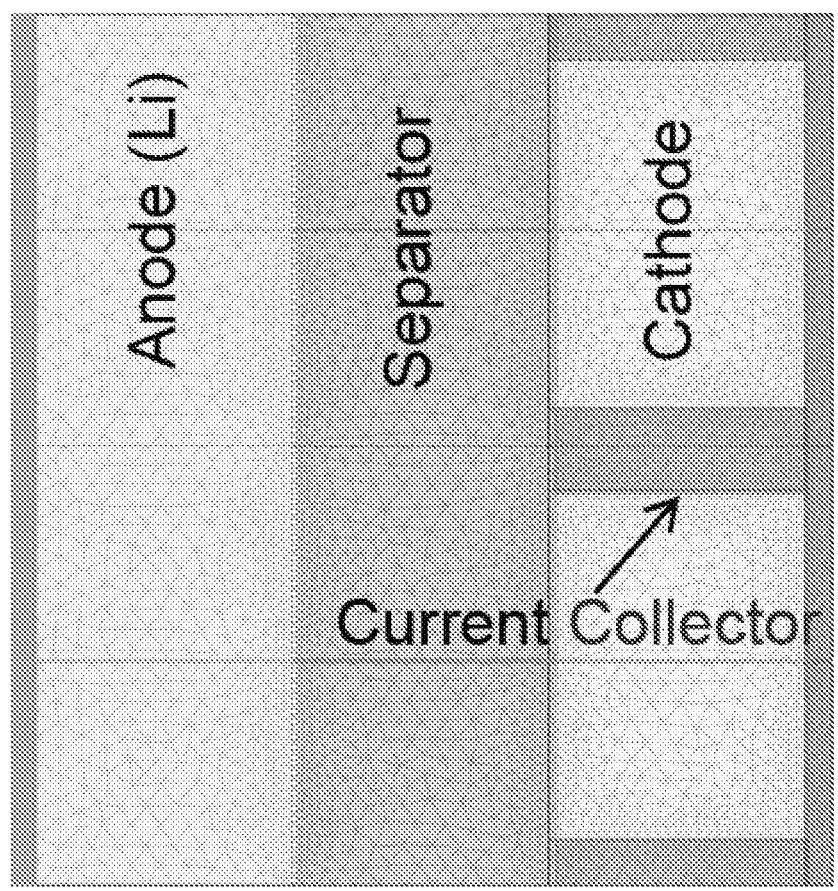
FIG. 3A reveals the configuration and boundary conditions of a finite-element COMSOL model used in some embodiments.

The configuration and boundary conditions of the finite-element COMSOL model are shown in FIG. 3A. The model represents a two-dimensional slice of a structure made from parallel ridges of porous foam material (conductive porous ridges).

Figure 3B:
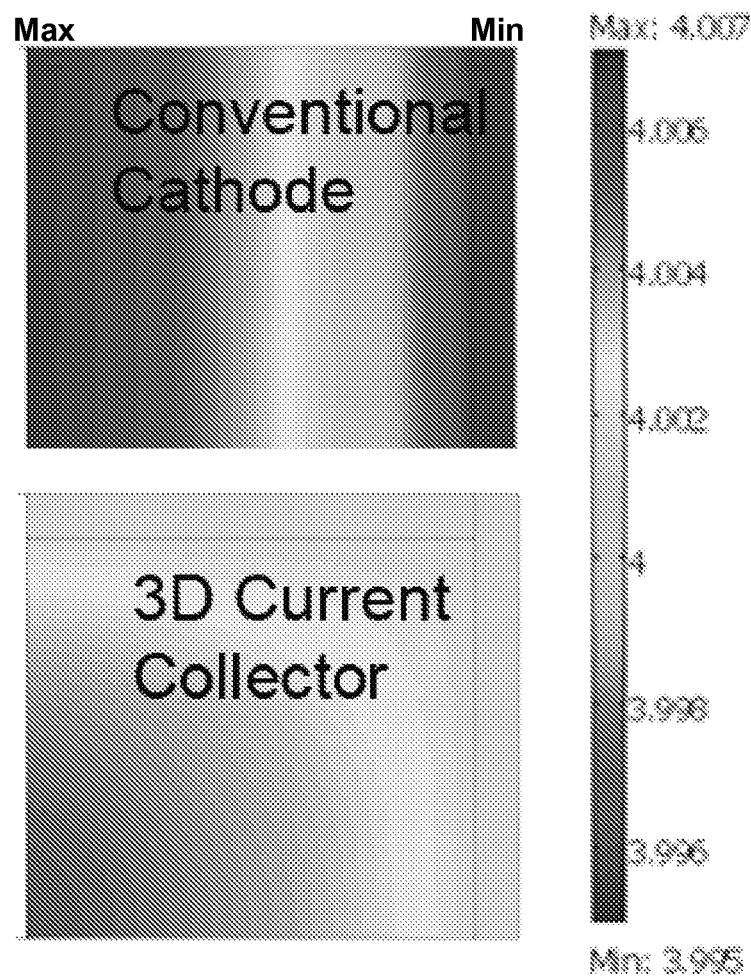
FIG. 3B plots electric potential distributions of a traditional planar electrode and a three-dimensional electrode with conductive porous ridges, using the model depicted in FIG. 3A.

The electric potential distributions of a traditional planar electrode and the modeled three-dimensional electrode with conductive porous ridges are shown in FIG. 3B. According to FIG. 3B, there is a lower voltage drop across the three-dimensional electrode, which results in greater power.

Figure 3C:
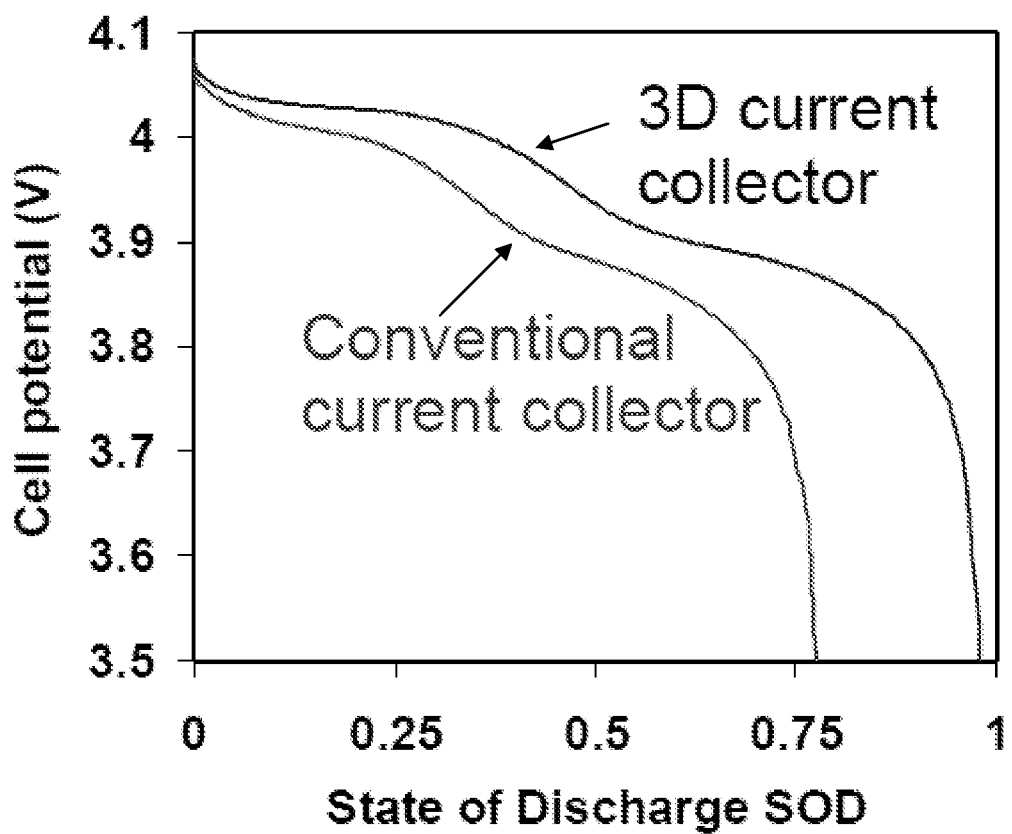
FIG. 3C depicts simulated discharge curves from a traditional planar electrode and a three-dimensional electrode with conductive porous ridges, using the model depicted in FIG. 3A.

FIG. 3C shows simulated discharge curves from a traditional planar electrode and the modeled three-dimensional electrode. The three-dimensional electrode results in about 30% higher energy density. This modeling shows that conductive foam ridges rising up through an electrode, as provided in this invention, can significantly increase the cathode power density in a lithium-ion battery, such as by 30% or more.

Example 1B

Optimization of Electrode

Using the model as constructed and described in Example 1, a series of simulations are carried out to calculate the energy density as a function of electrode geometry. It is found that the greatest increase in energy density occurs for foam pillars that are 300 µm in height and 20 µm in width, spaced 200 µm apart, within the parameter space explored.

Example 2

Formation of a Si Mold

Guided by the model in Examples 1A and 1B, a mold is formed by creating a photomask with 25 µm wide lines spaced 200 µm apart. A Si wafer is coated with photoresist, exposed through the mask, and then the unexposed resist is washed away. Then the wafer is etched using a deep reactive ion etch (DRIE) to create an array of high-aspect-ratio silicon trenches spaced about 200 µm apart and about 250 µm deep. The trenches are about 18 µm wide after processing.

Example 3

Formation of a Fluoropolymer Mold

A silicon master fabricated in Example 2 is used to fabricate an elastomeric mold. The ridged silicon master is treated with a fluorinated silane, trichloro(1H, 1H, 2H, 2H-perfluorooctyl) silane to generate a flat uniform non-wetting surface. Once the patterned silicon wafer is treated for at least 1 hr with the fluorinated silane, a fluorinated monomer with 1 wt % of photoinitiator (2,2-dimethoxy-2-phenylacetophenone or Darocur® 4265, BASF, Germany) is drop cast onto the wafer. The fluorinated monomers may be perfluoropolyether dimethacrylate (PFPE DMA) or fluorinated acrylate oligomers. The fluorinated monomer on the patterned silicon wafer is then placed under UV light for approximately 120 seconds to cure the monomer. The patterned fluorinated material is then separated from the silicon wafer and used for formation of patterned foams.

Example 4

Formation of a Direct Silicon Mold

A mold for fluidic foam precursors is formed by creating a photomask with about 25 µm wide lines spaced about 200 µm apart. A Si wafer is coated with photoresist, exposed through the mask, and then the exposed resist is washed away. Then the wafer is etched using a deep reactive ion etch (DRIE) to create parallel ridges spaced about 200 µm apart. The ridges are about 18 µm wide after processing. It is noted that this mold is the opposite of the mold in Example 2—that is, the ridges in this Example 4 are 18 µm wide while the trenches in Example 2 are 18 µm wide.

Example 5

Formation of Carbon Aerogel Ridged Electrode

A 40 wt % organic aerogel solution with a 2:1 formaldehyde:resorcinol ratio and a 500:1 resorcinol:sodium carbonate ratio is synthesized, forming an aerogel that does not require supercritical $CO_2$ exchange. This recipe is based on Li et al., *Chem. Mater.* 2004, 16, 5676.

For example, 20.70 g resorcinol, 30.74 g 36.5 wt % formaldehyde in water solution, 28.32 g water, and 0.040 g $Na_2CO_3$ are mixed and stirred until dissolved. This solution is allowed to sit for 30 minutes prior to use in carbon foam synthesis. The Si mold from Example 4 is fluorinated with fluorosilanes and then placed in the bottom of a Teflon®-lined acid digestion bomb. The aerogel precursor solution is poured over the mold and then the bomb is sealed and placed into an 80° C. oven for 3 days. The resulting resorcinol-formaldehyde aerogel structures are placed in acetone to solvent-exchange water out of the aerogel for 3 hr. The acetone is poured off, and the process is repeated two more times.

Finally the Si mold is removed and the ridged electrode precursor is placed in a tube furnace under flowing $N_2$ and heated from room temperature to 800° C. in 5 hr, held at 800° C. for 6 hr, and cooled back to ambient temperature in 3 hr.

Figure 4:
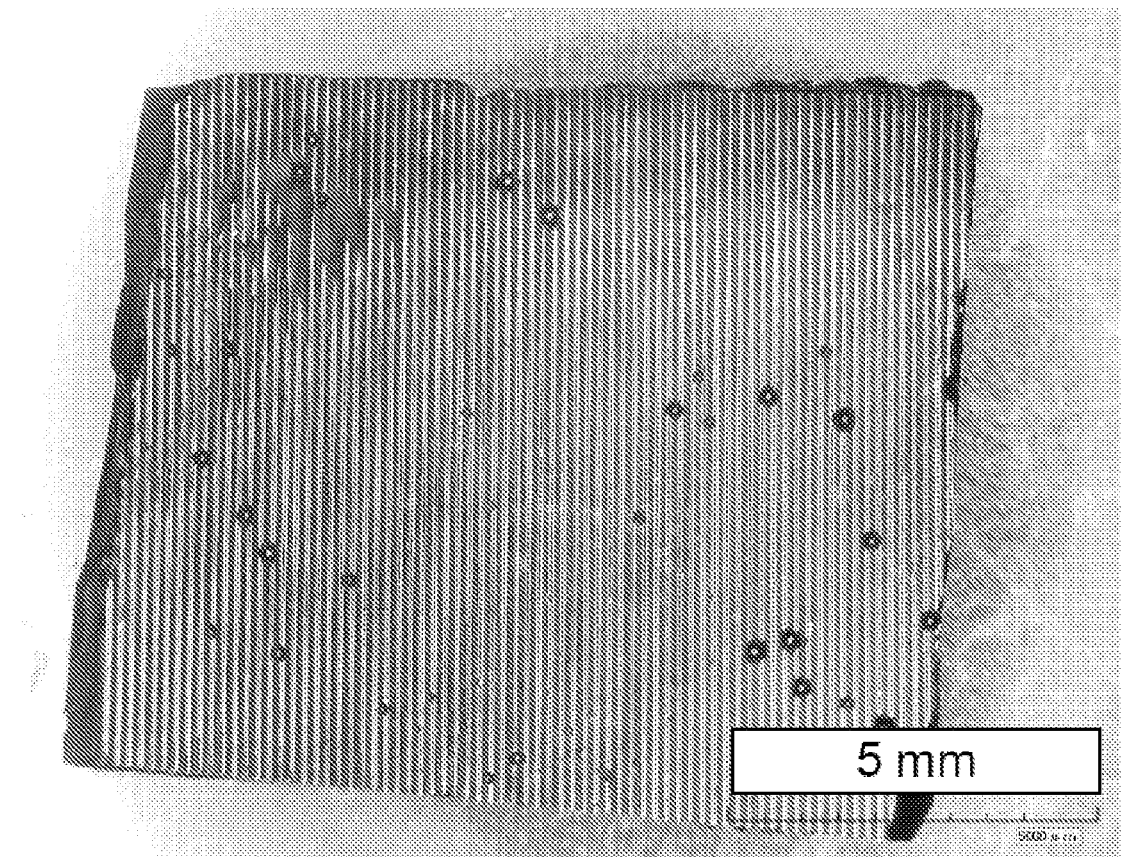
FIG. 4 shows an optical picture of a ridged aerogel electrode, according to some embodiments of the invention relating to Example 5.
Figure 5A:
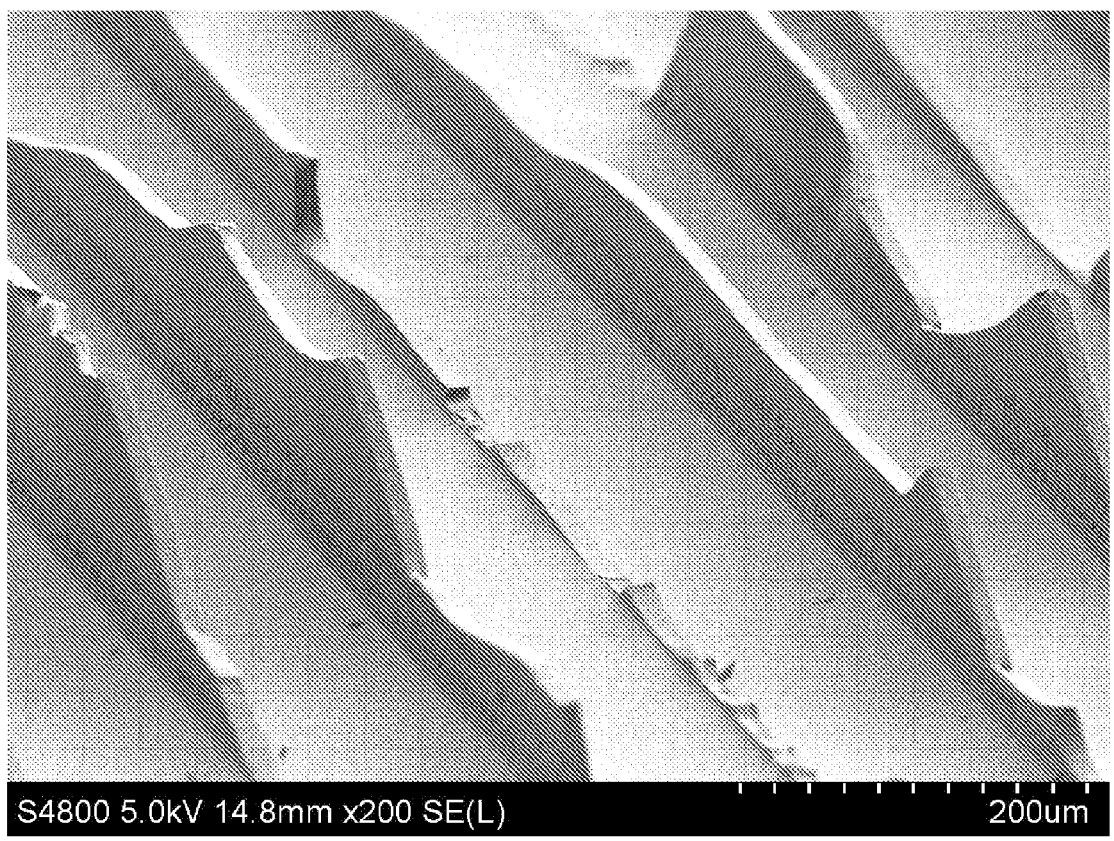
FIG. 5A shows an SEM image of a ridged aerogel electrode, according to some embodiments relating to Example 5.
Figure 5B:
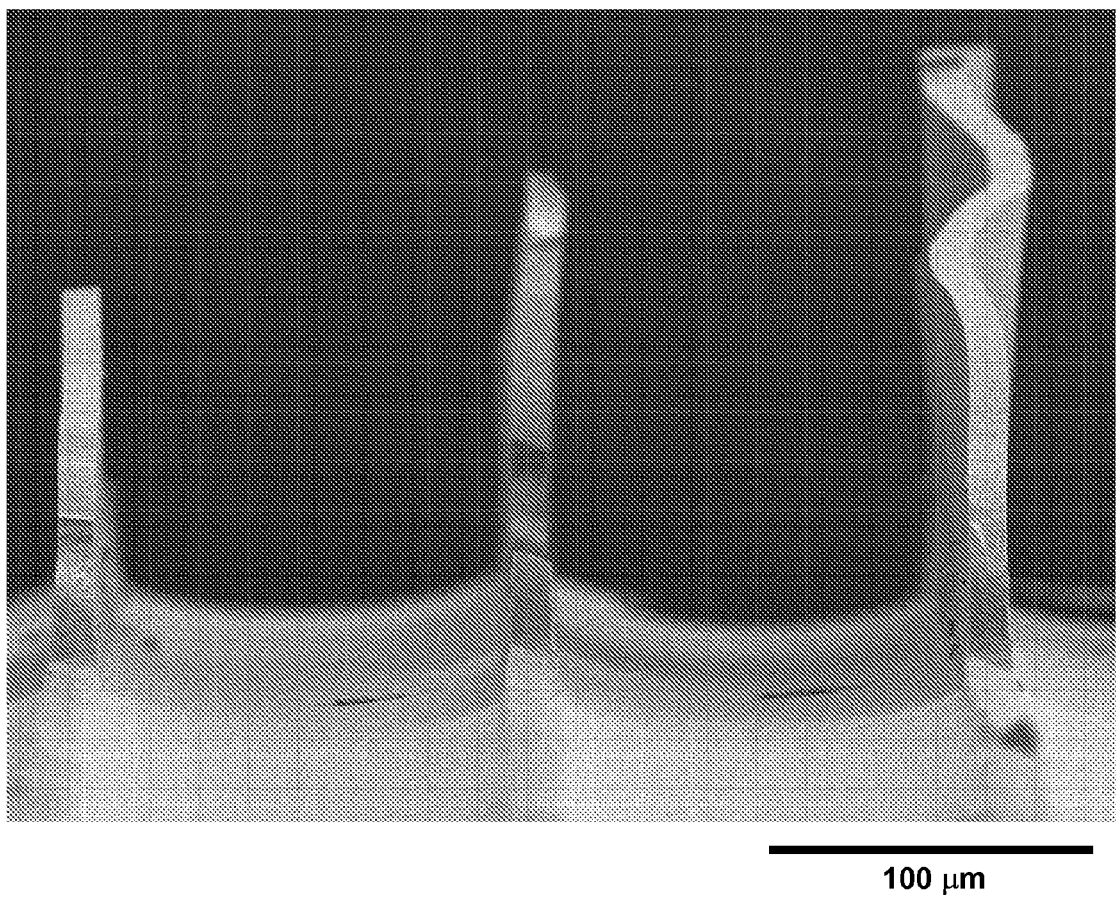
FIG. 5B shows an SEM image of a ridged aerogel electrode, according to some embodiments relating to Example 5.

The carbonized aerogel ridge structures are revealed in FIGS. 4, 5A, and 5B. FIG. 4 is an optical picture of the ridged aerogel electrode. FIGS. 5A and 5B show scanning electron microscope (SEM) images of the ridged aerogel electrode. Some breakage of the ridges during mold removal is observed.

Example 6

Formation of Carbon Foam Ridged Electrode

A 40 wt % organic aerogel solution with a 2:1 formaldehyde:resorcinol ratio and a 500:1 resorcinol:sodium carbonate ratio is synthesized, forming an aerogel that does not require supercritical $CO_2$ exchange. This recipe is based on Li et al., *Chem. Mater.* 2004, 16, 5676.

For example, 20.70 g resorcinol, 30.74 g 36.5 wt % formaldehyde in water solution, 28.32 g water, and 0.040 g $Na_2CO_3$ are mixed and stirred until dissolved. This solution is allowed to sit for 30 minutes prior to use in carbon foam synthesis. Next, a carbon foam is formed by mixing 12.5 g of the aerogel with 0.360 g sodium dodecylbenzensulfonic acid surfactant, vortex-stirred until homogeneous, and poured into a Waring laboratory blender. Then 37.5 g of 1000 cp silicone oil (Dow Corning® 200 fluid) is added to the blender. The contents of the blender are mixed for 10 minutes.

The fluoropolymer mold from Example 3 is placed in the bottom of a Teflon-lined acid digestion bomb. The blended carbon foam precursor is poured over the mold and then the bomb is sealed and placed into an 80° C. oven for 3 days. The resulting resorcinol-formaldehyde foam structures are observed to be bright orange and are soaked in chloroform to remove the silicon oil for 4 hours, and then the solvent is poured off. This solvent exchange process is repeated two more cycles with soaking times of 4 hr and 12 hr. Then the foams are placed in acetone to solvent-exchange water out of the aerogel for 3 hr, the acetone is poured off, and the process is repeated two more times.

Finally the fluoropolymer mold is removed and the ridged structure is placed in a tube furnace under flowing $N_2$ and heated from room temperature to 800° C. in 5 hr, held at 800° C. for 6 hr, and cooled back to ambient temperature in 3 hr.

Figure 6:
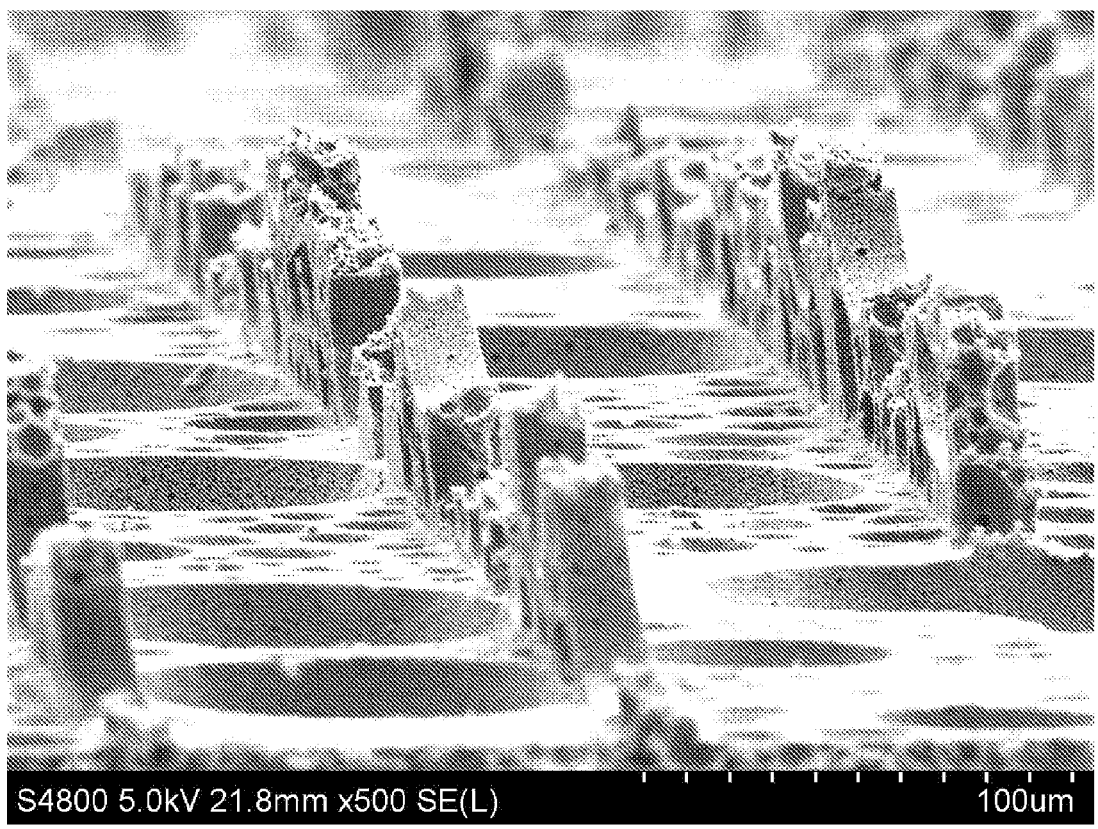
FIG. 6 reveals an SEM image of a carbonized ridged foam electrode, according to certain embodiments relating to Example 6.

The carbonized foam ridged electrode is shown in FIG. 6, which is an SEM image of the ridged foam electrode with multiple foam protrusions along the surface. Some breakage of the ridges during mold removal is observed.

Example 7

Formation of Battery Anode with Ridged Aerogel Electrode

A ridged aerogel electrode from Example 5 is formed into a Li battery anode. Graphitic carbon (Superior Graphite, SLC 1520) is used as the active material in a carbon-based energy-storage material, to test the performance of the three-dimensional ridged electrodes. The composition of the energy-storage material is about 93 wt % active carbon material, 3 wt % carbon black (Super P), and 4 wt % SBR binder (an aqueous styrene-butadiene rubber binder, LHB-108P).

Figure 7:
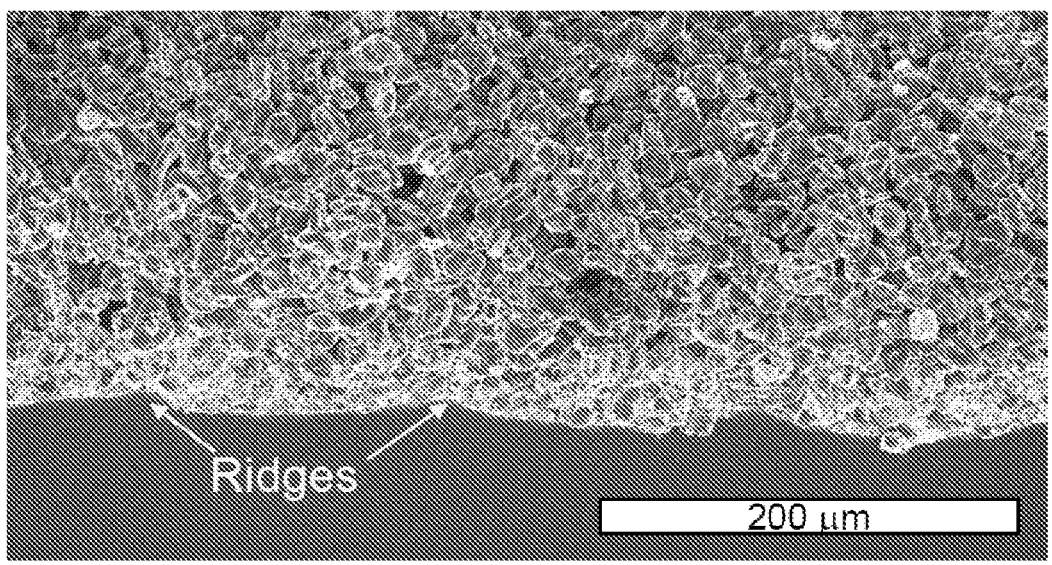
FIG. 7 shows an SEM image of a filled ridged electrode, according to some embodiments relating to Example 7.

The electrode materials are mixed and made into a slurry using water. The slurry is cast onto the three-dimensional ridge substrate. The electrode is then heated overnight at 100° C. under vacuum to dry out the moisture. An SEM image of the filled ridged electrode is shown in FIG. 7. In FIG. 7, the ridged aerogel is the bottom uniform dark grey material, while the particulate material is the lithium-ion energy-storage material. No empty space is left between the ridges during slurry casting.

Variations of this invention will allow faster charging and discharging batteries with longer lifetimes and greater energy densities as well as greater power density fuel cells. There are various commercial, military, and aerospace applications of this invention in electrochemical devices, including batteries and fuel cells. Applications for this invention include, but are not limited to, laptop computers, mobile phones, cameras, medical devices, electric vehicles, electric bikes, scooters, power tools, small power plants, electric and hybrid vehicles, auxiliary power, off-grid power supply, battery back-up power, notebook computers, portable electronics, satellites, unmanned aerial vehicles, and surveillance systems.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An electrode precursor comprising an electrically conductive layer and a plurality of electrically conductive porous foam protrusions extending from one side of said electrically conductive layer,
   wherein said porous foam protrusions have an average protrusion width selected from about 1 μm to about 100 μm;
   wherein said porous foam protrusions have an average protrusion height selected from about 10 μm to about 10 mm;
   wherein said porous foam protrusions have an average protrusion spacing between adjacent protrusions selected from 10 μm to about 10 mm;
   wherein said porous foam protrusions contain spherical macropores, and further contain micropores; and
   wherein said porous foam protrusions are characterized by an average tortuosity of 1.1 or higher but less than 5 for pores within said porous foam protrusions, and
   wherein said micropores have a pore-size peak from 3 nm to 50 nm as measured by $N_2$ adsorption.

2. The electrode precursor of claim 1, wherein said average tortuosity is about 2 or less.

3. The electrode precursor of claim 1, wherein said spherical macropores have a pore-size peak from about 1 μm to about 20 μm as measured by scanning electron microscopy.

4. The electrode precursor of claim 1, wherein said average protrusion width is selected from about 10 μm to about 50 μm.

5. The electrode precursor of claim 1, wherein said average protrusion height is selected from about 100 μm to about 500 μm.

6. The electrode precursor of claim 1, wherein said average protrusion spacing is selected from about 100 μm to about 500 μm.

7. The electrode precursor of claim 1, wherein said porous foam protrusions have a geometry selected from the group consisting of rectangular, square, round, cylindrical, polygonal, pyramidal, and combinations thereof.

8. The electrode precursor of claim 1, wherein said porous foam protrusions form reticulated lines.

9. The electrode precursor of claim 1, wherein said electrically conductive layer and said porous foam protrusions are made from the same material.

10. The electrode precursor of claim 1, wherein said electrically conductive layer and said porous foam protrusions are independently fabricated from or coated with an element selected from the group consisting of C, Cu, Ni, Au, Ag, Al, Sn, Cr, Zn, Ti, Co, Pt, Mn, Fe, V, Pd, W, Nb, Ta, Ru, and combinations and alloys thereof.

11. The electrode precursor of claim 1, wherein said porous foam protrusions further contain mesopores having a pore-size peak from 0.1 µm to 1 µm as measured by Hg intrusion, wherein said mesopores are macropore windows.

* * * * *